United States Patent [19]

Cleary, James W.

[11] Patent Number: 5,077,374

[45] Date of Patent: Dec. 31, 1991

[54] AROMATIC SULFIDE POLYMERS AND METHOD OF PREPARATION

[75] Inventor: Cleary, James W., Neenah, Wis.

[73] Assignee: Phillips Petroleum Company, Bartlesville, Okla.

[21] Appl. No.: 512,121

[22] Filed: Apr. 20, 1990

[51] Int. Cl.$^5$ ............................................. C08G 75/02
[52] U.S. Cl. ...................................... 528/86; 528/388; 528/389
[58] Field of Search ................................. 528/86, 389

[56] References Cited

U.S. PATENT DOCUMENTS

| | | | |
|---|---|---|---|
| 2,509,938 | 5/1950 | Patterson et al. | 260/329 |
| 4,375,427 | 3/1983 | Miller et al. | 252/512 |
| 4,452,727 | 6/1984 | Frommer et al. | 252/519 |
| 4,462,929 | 7/1984 | Shacklette et al. | 252/518 |
| 4,527,219 | 7/1985 | Johnson et al. | 361/323 |
| 4,540,620 | 9/1985 | Johnson et al. | 428/195 |

OTHER PUBLICATIONS

The Merck Index of Chemicals and Drugs, 7th Edition, Merck & Co., Rahway, N.J., 1960, p. 658.

Chemical Abstracts, vol. 91, 1979, Item 91:2161t, p. 46.

Polutt, A. H., *Organic Syntheses*, vol. II, 3rd printing, pp. 485 and 486.

Shacklette, L. W. et al., "Conducting Complexes of Polyphenylene Sulfides", *J. Chem. Phys.*, 75(4), Aug. 15, 1981, pp. 1919–1927.

Elsenbaumer, R. L. et al. "Highly Conductive Meta Derivatives of Poly(phenylene sulfide)", *Journal of Polymer Science: Polymer Physics Edition*, vol. 20, 1982, pp. 1781–1787.

Cleary, J. W., *Polymers from Benzene and Sulfur: Friedel and Crafts Revisited*, Advances in Polymer Synthesis, Plenum Press, New York and London, 1985, pp. 159–172.

*Primary Examiner*—Harold D. Anderson
*Attorney, Agent, or Firm*—Laney, Dougherty, Hessin & Beavers

[57] ABSTRACT

This invention provides a method for producing high temperature aromatic sulfide polymers which are well suited for use as base compounds in conductive applications. In the method of the present invention, sulfur and a bridged diaromatic reactant compound are reacted in an inert polyhaloaromatic solvent and in the presence of a strong Friedel-Crafts metallic halide catalyst. One novel polymer produced by the method of the present invention is poly(phenoxathiinyl sulfide).

20 Claims, No Drawings

AROMATIC SULFIDE POLYMERS AND METHOD OF PREPARATION

BACKGROUND OF THE INVENTION

1. Field of the Invention

This invention relates to aromatic sulfide polymers. In one aspect, the invention relates to aromatic sulfide polymers suitable for use in conductive applications. In another aspect, the invention relates to high temperature aromatic sulfide polymers. In another aspect, the invention relates to methods for producing aromatic sulfide polymers.

2. Description of the Prior Art

Aromatic sulfide polymers are generally well known for their thermal stability and chemical resistance. Various aromatic sulfide polymers have also proven to be well suited for use as base compounds in conductive applications. In conductive applications, electrical conductivity is imparted to the aromatic sulfide polymer using methods known in the art. Aromatic sulfide polymers are used to manufacture extremely lightweight electrical components such as capacitors, circuit boards, integrated circuits, etc.

Most prior art methods for producing aromatic sulfide polymers require the use of aromatic reactants which have chloronated aromatic nuclei. The need to use chloronated aromatic reactants is disadvantageous due to the difficulty experienced in placing chloro groups in the required reactive positions on the aromatic nucleus.

It is also known that aromatic sulfide polymers having repeating units of the formula:

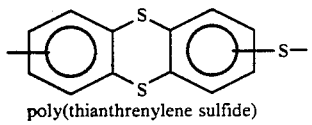

poly(thianthrenylene sulfide)

can be produced by reacting benzene, diphenyl sulfide, or thianthrene with sulfur using an aluminum chloride catalyst and a 1,2,4-trichlorobenzene solvent. Benzene, diphenyl sulfide, and thianthrene have the following formulas:

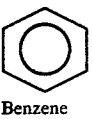

Benzene

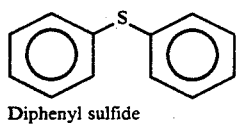

Diphenyl sulfide

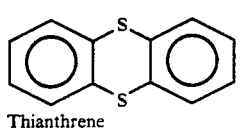

Thianthrene

The present invention provides a novel and economical method for producing high temperature aromatic sulfide polymers having repeating units of the formula:

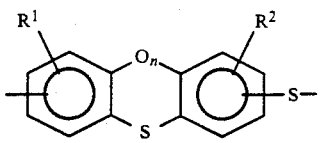

which are suitable for use in conductive applications. The production of these polymers by the method of the present invention has heretofore been unknown. In the method of the present invention, aromatic sulfide polymers are produced by reacting diaromatic reactant compounds of the formula:

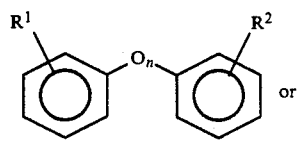

or

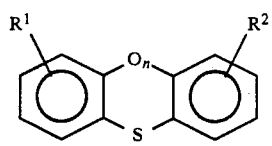

with elemental sulfur in an inert polyhaloaromatic solvent and in the presence of a strong Friedel-Crafts metallic halide catalyst. In all of the formulas provided above, $R^1$ and $R^2$ are independently selected from hydrogen and alkyl groups having from about 1 to about 6 carbon atoms and n is 0 or 1.

When the selected diaromatic reactant compound is diphenyl ether, the aromatic sulfide polymer produced according to the method of the present invention is poly(phenoxathiinyl sulfide). Poly(phenoxathiinyl sulfide) is a novel, high temperature aromatic sulfide polymer which has heretofore been unknown. Poly(phenoxathiinyl sulfide) is well suited for use as a base compound in conductive applications.

SUMMARY OF THE INVENTION

The present invention provides a novel aromatic sulfide polymer and a novel method for producing certain aromatic sulfide polymers.

In the method of the present invention, sulfur and a diaromatic reactant compound are reacted in an inert polyhaloaromatic solvent and in the presence of a strong Friedel-Crafts metallic halide catalyst to produce an aromatic sulfide polymer. The diaryl reactant compound comprises two aromatic groups and an original bridge connected between the two aromatic groups. The original bridge can be a direct carbon-carbon bond or an oxygen atom bonded between the two aromatic groups. The aromatic sulfide polymer produced by the method of the present invention has repeat unit of the formula $-(Ar-S)-$. Ar comprises the two aromatic groups, the original bridge connected between the two aromatic groups, and a sulfur atom bonded between the two aromatic groups.

The novel compound provided by the present invention is an aromatic sulfide polymer having repeat units of the formula:

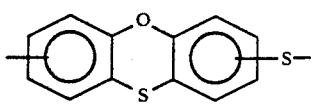

It is therefore an object of the present invention to provide a method for producing aromatic sulfide polymers.

It is another object of the present invention to provide a novel, high temperature, aromatic sulfide polymer which can be used as a base compound in conductive applications.

It is another object of the present invention to provide a method for producing high temperature aromatic sulfide polymers which are well suited for use as base compounds in conductive applications.

Further objects, features, and advantages of the present invention will readily appear to those skilled in the art upon a reading of the following description of the preferred embodiments.

DESCRIPTION OF THE PREFERRED EMBODIMENTS

The present invention provides a novel aromatic sulfide polymer and a novel method for preparing certain aromatic sulfide polymers. In the method of the present invention, a diaromatic reactant compound is reacted with sulfur to produce an aromatic sulfide polymer. The diaromatic reactant compound and sulfur are reacted in an inert polyhaloaromatic solvent and in the presence of a strong Friedel-Crafts metallic halide catalyst.

The diaromatic reactant compounds used in the method of the present invention comprise two aromatic groups and at least one original bridge connected between the two aromatic groups. The original bridge can comprise either a direct carbon-carbon bond or an oxygen atom bonded between the two aromatic groups. If the diaromatic reactant compound has two original bridges connected between its aromatic groups, one of the bridges is a sulfur atom bridge.

One group of diaromatic reactant compounds suitable for use in the method of the present invention is comprised of single bridged diaromatic compounds having the formula:

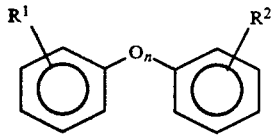

wherein $R^1$ and $R^2$ are independently selected from hydrogen and alkyl groups having from about one to about six carbon atoms and n is 0 or 1. When n is 0, the above formula should be read as indicating a direct carbon-carbon bond between the aromatic groups of the diaromatic compound. Examples of suitable diaromatic reactant compounds having the above-identified formula include: biphenyl; 2-methylbiphenyl; 4-methylbiphenyl; 2,3-dimethylbiphenyl; 3-hexylbiphenyl; diphenyl ether; 2-dimethylbiphenyl; and like compounds. Due to their ready availability, diphenyl ether and biphenyl are preferred for use in the method of the present invention.

Another group of diaromatic reactant compounds suitable for use in the method of the present invention comprises double bridged diaromatic compounds of the formula:

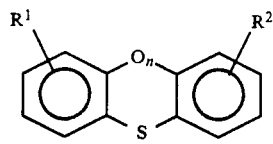

wherein $R^1$ and $R^2$ are independently selected from hydrogen and alkyl groups having from about one to about six carbon atoms and n is 0 or 1. When n is 0, the above formula should be read as indicating a direct carbon-carbon bond between the aromatic groups of the diaromatic compound. Examples of suitable double bridged diaromatic reactant compounds include: phenoxathiin; dibenzothiophene; alkyl substituted derivatives of these compounds; and like compounds.

The sulfur used in the method of the present invention is elemental sulfur. Although any form of elemental sulfur can be used, a fine sulfur powder (e.g., flowers of sulfur formed by sublimation) is preferred. Fine sulfur powder will readily dissolve in the inert polyhaloaromatic solvents used in the present invention.

The diaromatic reactant compound and sulfur are reacted in accordance with the method of the present invention to produce an aromatic sulfide polymer having repeat units of the formula $-(Ar-S)-$. Ar is an aromatic structure comprising the two aromatic groups of the diaromatic reactant compound and the original bridge(s) connected between the two aromatic groups. If the diaromatic reactant compound has only a single original bridge, an additional sulfur bridge is formed between the two aromatic groups when the diaromatic reactant compound is reacted with sulfur in accordance with the method of the present invention.

When a diaromatic reactant compound having only a single original bridge is reacted with elemental sulfur in accordance with the method of the present invention, the reaction is believed to proceed as follows:

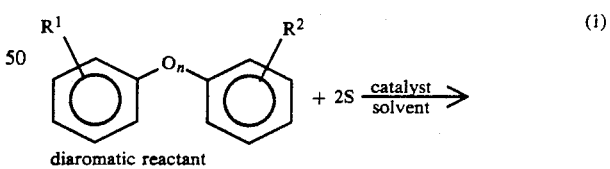

diaromatic reactant

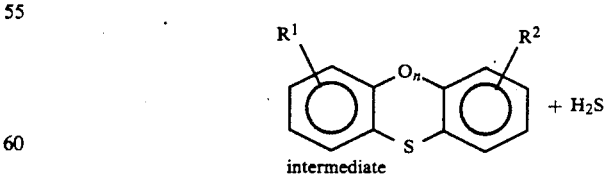

intermediate

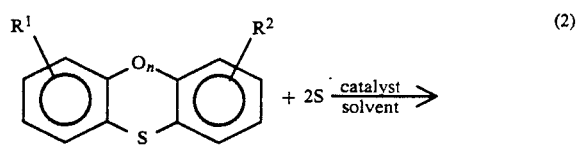

-continued

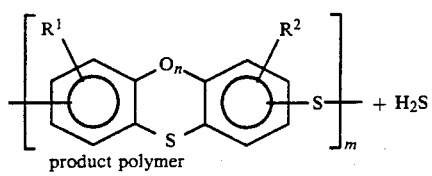
product polymer

As set forth above, $R^1$ and $R^2$ are independently selected from hydrogen and alkyl groups having from about one to about six carbon atoms and n is 0 or 1. m is an integer greater than about 10.

When a diaromatic reactant compound having two original bridges is reacted with elemental sulfur in accordance with the method of the present invention, the reaction proceeds as follows:

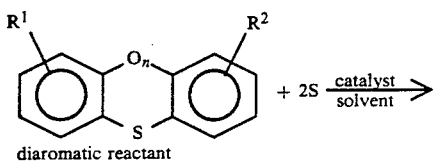
diaromatic reactant

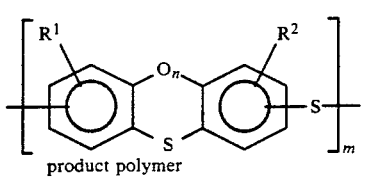
product polymer

As set forth above, $R^1$ and $R^2$ are independently selected from hydrogen and alkyl groups having from about one to about six carbon atoms and n is 0 or 1. m is an integer greater than about 10.

When a diaromatic reactant compound having only a single original bridge is reacted with elemental sulfur in accordance with the method of the present invention, the initial reaction mixture comprises sulfur in a concentration in the range of from about 3.5 moles to about 10 moles per mole of the diaromatic reactant compound. As illustrated in the examples provided below, only oligomeric products are formed when the initial sulfur concentration is less than about 3.5 moles per mole of the diaromatic reactant compound. However, excessive initial sulfur concentrations promote unwanted chain branching and cross-linking. In order to achieve superior polymer product yields without excessive chain branching and cross-linking, the reaction is preferably conducted using an initial sulfur concentration of about 4 moles per mole of the diaromatic reactant compound.

When a diaromatic reactant compound having two original bridges is reacted with elemental sulfur in accordance with the method of the present invention, the initial reaction mixture comprises sulfur in a concentration in the range of from about 0.5 moles to about 10 moles per mole of the diaromatic reactant compound. As mentioned above, excessive initial sulfur concentrations promote unwanted chain branching and cross-linking. In order to achieve a superior polymer product yield without excessive chain branching and cross-linking, the reaction is preferably conducted using an initial sulfur concentration of about 2 moles per mole of the diaromatic reactant compound.

In accordance with the method of the present invention, diphenyl ether is reacted with sulfur to produce poly(phenoxathiinyl sulfide). The reaction is believed to proceed as follows:

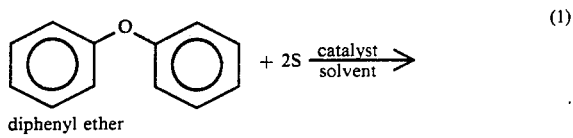
diphenyl ether

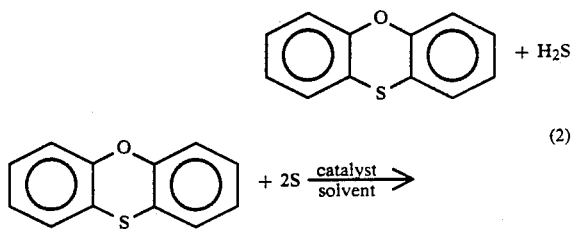

poly(phenoxathiinyl sulfide)

wherein m is an integer greater than 10.

Poly(phenoxathiinyl sulfide) is a novel aromatic sulfide polymer which is well suited for high temperature applications and for use as a base compound in conductive applications. Although some reaction by-products may be present, poly(phenoxathiinyl sulfide) is essentially a homopolymer. Poly(phenoxathiinyl sulfide) becomes tacky at a temperature of 189° C. and melts at a temperature of 212° C. The polymer can be melt-spun into fiber at 200° C. Poly(phenoxathiinyl sulfide) has a glass transition temperature of 104° C. and an inherent viscosity of 0.0513 dL/g (2.0088 grams of polymer in 100 milliliters of concentrated sulfuric acid at 30° C.). Poly(phenoxathiinyl sulfide) has been found to exhibit good melt stability, even when held at 370° C. for ten minutes. Additionally, the polymeric structure of poly(phenoxathiinyl sulfide), as verified by infrared analysis, is similar to the polymeric structures of other compounds which are used in conductive applications.

One group of inert polyhaloaromatic solvents suitable for use in the method of the present invention is comprised of trihaloaromatic compounds and mixtures of trihaloaromatic compounds having the formula $R^3Y_a$ wherein Y is chlorine, bromine, or iodine; a is an integer in the range of from three to six; and $R^3$ is a polyvalent aromatic radical substituted with from 0 to 4 methyl groups. $R^3$ has a total number of carbon atoms in the range of from about 6 to about 16. Examples of suitable polyhaloaromatic solvents having the formula $R^3Y_a$ include: 1,2,3-trichlorobenzene; 1,3,5-trichlorobenzene; 1,2,4-trichlorobenzene; 1,3-dichloro-5-bromobenzene; 1,2,3,5-tetrabromobenzene; hexachlorobenzene; 1,3,5-trichloro-2,4,6-trimethylbenzene; 2,2',4,4'-tetrachlorobiphenyl; 2,2',5,5'-tetraiodobiphenyl; 1,2,3,4-tetrachloronaphthalene; 1,2,4-tribromo-6-methylnaphthalene; like compounds; and mixtures of such polyhaloaromatic compounds. The preferred polyhaloaromatic solvent is 1,2,4-trichlorobenzene.

Several inert dihaloaromatic solvents can also be used in the method of the present invention. Examples of such dihaloaromatic solvents include: 1,2-dichlorobenzene; 1,3-dichlorobenzene; 1,4-dichlorobenzene; 1,4-dibromobenzene; 2,3-dichlorotoluene; 2,4-dichlorotoluene; 2,5-dichlorotoluene; 1,2,4,5-tetramethyl-3,6-dichlorobenzene; 1-butyl-4-cyclohexyl-2,5-dibromobenzene; like compounds; and mixtures of such dihaloaromatic compounds. These dihaloaromatic solvents can also be used in mixture with suitable trihaloaromatic solvents.

In the method of the present invention, the inert polyhaloaromatic solvent is present in the initial reaction mixture in a concentration in the range of from about 10% to about 1000% by weight based on the weight of the diaromatic reactant compound used. The solvent is preferably present in the initial reaction mixture in a concentration in the range of from about 150% to about 500% by weight based on the weight of the diaromatic reactant used.

The strong Freidel-Crafts metallic halide catalyst used in the method of the present invention is preferably in powder or crystalline form. Although the amount of catalyst used does not appear to be critical, the catalyst is preferably present in the initial reaction mixture in a concentration in the range of from about 0.0001 mole to about 1.0 mole per mole of diaromatic reactant compound used. More preferably, from about 0.05 mole to about 0.5 mole of catalyst is used per mole of diaromatic reactant compound.

Strong Friedel-Crafts metallic halide catalysts include aluminum chloride, aluminum bromide, aluminum iodide, antimony pentafluoride, zirconium tetrachloride, gallium chloride, and the like and mixtures thereof. Anhydrous aluminum chloride ($AlCl_3$) has been found to be a particularly suitable catalyst for use in the method of the present invention.

The reaction of the present invention can be conducted under pressure conditions ranging from a partial vacuum to super atmospheric. In order to avoid high equipment and energy costs required to pressurize the reactants and conduct the reaction at an elevated pressure, the reaction is preferably conducted at near atmospheric pressure. However, if desired, the reaction can be conducted under pressure in order to raise the boiling point of the polyhaloaromatic solvent and allow the use of higher reaction temperatures.

The reaction of the present invention is conducted at a temperature in the range of from about 20° C. (i.e., room temperature) to a temperature just below the boiling temperature of the inert polyhaloaromatic solvent. In order to obtain superior reaction rates and efficiencies, the reaction is preferably conducted at a temperature in the range of from about 90° C. to about 200° C.

In a preferred embodiment of the method of the present invention, elemental sulfur, a diaromatic reactant compound, a polyhaloaromatic solvent, and a strong Friedel-Crafts metallic halide catalyst are combined to form an initial reaction mixture. The reaction mixture is heated to a temperature in the range of from about 20° C. to a temperature just below the boiling temperature of the polyhaloaromatic solvent. As discussed above, the reaction mixture is preferably heated to a temperature in the range of from about 90° C. to about 200° C. The temperature is preferably raised slowly in order to avoid excessive hydrogen sulfide evolution. Excessive hydrogen sulfide evolution can cause the reaction mixture to foam. When the desired reaction temperature is reached, the sulfur and the diaromatic reactant compound are allowed to react in solution and in the presence of the Friedel-Crafts metallic halide catalyst. The reaction is allows to proceed until hydrogen sulfide evolution slows significantly or stops.

After completion of the reaction, the polymer product can be recovered from the post-reaction materials using anhydrous methanol. The aromatic sulfide polymer product, which precipitates during the reaction process, will not dissolve in the anhydrous methanol. However, the anhydrous methanol operates to destroy the strong Friedel-Crafts metallic halide catalyst and dissolve most of the unwanted post-reaction materials, including oligomers formed during the reaction process. The methanol and dissolved impurities can be separated from the polymer product by filtration and drying. Additional impurities can be removed using toluene as illustrated in the examples which follow.

The aromatic sulfide polymers produced by the method of the present invention, including poly(phenoxathiinyl sulfide), can be processed for end use by numerous methods known in the art. Such methods include melt processing, solvent casting, extrusion, etc. The aromatic sulfide polymers produced by the method of the present invention can also be blended and used with other high temperature aromatic sulfide polymers such as poly(phenylene sulfide).

The aromatic sulfide polymers formed by the method of the present invention can be used as base materials for the production of electrical components, e.g., circuit boards, integrated circuits, capacitors, etc. Such electrical components can be prepared using any suitable method known in the art for imparting electrical conductivity to an aromatic sulfide polymer material. For example, a chemical doping technique can be used to complex the aromatic sulfide polymer with an electron acceptor, such as $AsF_5$ or $SbF_5$, or an electron donor.

The following examples are provided in order to further illustrate the present invention.

EXAMPLE I

Diphenyl ester was reacted with sublimed sulfur in a polyhaloaromatic solvent and in the presence of a strong Friedel-Crafts metallic halide catalyst to produce poly(phenoxathiinyl sulfide). 100 milliters (147.7 grams, 0.81 moles) of 1,2,4-trichlorobenzene; 6.71 grams (0.10 moles) of anhydrous $AlCl_3$; 42.55 grams (0.25 moles) of diphenyl ether; and 30.46 grams (0.95 moles) of elemental sulfur (i.e., 3.8 moles of sulfur per mole of phenyl ether) where combined in a 3-necked round bottom 250 milliliter flask. The flask was equipped with a mechanical stirrer, a heating mantle, a thermometer, and a reflux condenser. The reflux condenser was connected to a bubble trap containing 1,2,4-trichlorobenzene. The bubble trap was in turn connected to an Erlenmeyer flask containing moist litmus paper and lead acetate test paper.

Using the mechanical stirrer and the heating mantle, the contents of the 3-necked flask were mixed and slowly heated. As the temperature of the reaction mixture approached 66° C., a dark color began to develop and $H_2S$ began to evolve at a rate of about 12 bubbles per minute. After about one hour of heating and mixing, the contents of the 3-necked flask had reached a temperature of 94° C. and $H_2S$ evolution had reached a rate of 120 bubbles per minute. The reaction mixture was heated and stirred for a total period of five hours. At the end of the five hour heating and stirring period, the reaction mixture had reached a temperature of 182° C. A maximum $H_2S$ evolution rate of 180 bubbles per minute was observed about an hour before heating and stirring was discontinued. No H₂S evolution was observed at the end of the five hour heating and stirring period.

At the end of the heating and stirring period, the reaction mixture was cooled to near ambient temperature and about 50 milliliters of anhydrous methanol were added to the reaction mixture through the condenser. A black solid material adhering to the walls of the 3-necked flask and detached by scraping. Following methanol addition and scraping, the contents of the 3-necked flask were heated, with stirring, and then cooled. Upon cooling, the contents of the flask separated to form an upper liquid layer and a bottom gel layer. The upper liquid layer, comprising primarily trichlorobenzene and methanol, was decanted through a filter. Material recovered in the filter was added to the gelled material.

The gelled material was slurried, by heating and stirring, with fresh methanol. This hot slurried gel was then cooled and filtered. Particulate solid material recovered by filtration was again slurried, by heating and stirring, in fresh methanol. This slurry was filtered hot. Water-white solid material recovered in the hot filtration step was dried in a vacuum oven at 100° C. to yield 43.19 grams (i.e., a 73.8 percent reaction yield) of green particulate poly(phenoxathiinyl sulfide).

The polymeric structure of the poly(phenoxathiinyl sulfide) product was confirmed by infrared analysis. The chemical analysis of the poly(phenoxathiinyl sulfide) product is set forth in Table I.

Tests conducted on the poly(phenoxathiinyl sulfide) product indicate that the polymer is well suited for use as a fiber, for high temperature uses, and for use in conductive applications. The melt behavior of the polymer product was tested on a hot bar. The polymer became tacky at 189.5° C. and could be pulled into a fiber at 201° C. The fiber melted at 212° C. and the resulting melted liquid remained stable at 370° C. during a ten minute stability test period. The polymer exhibited a glass transition temperature of 104° C. and an inherent viscosity of 0.0513 dL/g (2.0088 grams of polymer in 100 milliliters of concentrated sulfuric acid at 30° C.). The structure of the poly(phenoxathiinyl sulfide) product, as confirmed by infrared analysis, is similar to the polymeric structures of other compounds which are used in conductive applications.

TABLE I

Chemical Analysis of
Poly(phenoxathiinyl sulfide) Product

| | Weight Percent | | | |
|---|---|---|---|---|
| | C | H | O | S |
| Calculated | 62.57 | 2.63 | 6.95 | 27.85 |
| Analysis | 59.45 | 2.35 | 5.75 | 30.24 |

EXAMPLE II 100 mL (145.6 g, 0.81 moles) of 1,2,4-trichlorobenzene, 6.70 g (0.05 moles) of anhydrous AlCl₃ catalyst, 85.05 g (0.5 moles) of diphenyl ether and 32.05 g (1.0 mole) of sublimed sulfur (i.e., 2.0 moles of sulfur per mole of diphenyl ether) were combined and the sulfur and diphenyl ether were reacted according to the procedure described in Example I. The reaction mixture was heated, stirred and allowed to react for a period of about 8.25 hours. Over this period, the reaction mixture was steadily heated from room temperature to a final temperature of about 190° C. After the post-reaction material had cooled to a temperature of 102° C., 10 mL of concentrated HCl and about 50 Ml of water were added to the reaction mixture. The diluted post-reaction material formed a clear upper fluid layer and a 244 g lower black fluid layer. The 244 g black fluid layer was separated from the remainder of the diluted post-reaction material using a separatory funnel. The black fluid was found to comprise primarily 1,2,4-trichlorobenzene, phenoxathiin, unreacted diphenyl ether and unreacted sulfur. Only about 0.5 g of solid material was recovered from the black fluid.

EXAMPLE III 20 mL (30.24 g, 0.166 moles) of 1,2,4-trichlorobenzene, 1.33 g (0.01 moles) of anhydrous AlCl₃, 10.82 g (0.05 moles) of thianthrene, and 3.21 g (0.1 moles) of sublimed sulfur (i.e., 2 moles of sulfur per mole of thianthrene) wire conbined and the sulfur and theanthrene were reacted according to the procedure described in Example I. The reaction mixture was heated and stirred and allowed to react for a period of about seven hours. 8.18 g (i.e., a 66 percent reaction yield) of poly(thianthrenylene sulfide) were recovered from the post-reaction materials using methanol and filtration as described in Example I.

The molecular structure of the poly(thianthrenylene sulfide) product was confirmed using infrared analysis. The elemental analysis of the poly(thianthrenylene sulfide) product is set forth in Table II. Using a hot bar, the poly(thianthrenylene sulfide) product was found to have a melt point above 400° C. The polymer also was found to have an inherent viscosity of 0.0710 dL/g (1.9848 g in 100 mL of concentrated sulfuric acid at 30° C.).

TABLE II

Chemical Analysis of
Poly(thianthrenylene sulfide) Product

| | Weight Percent | | |
|---|---|---|---|
| | C | H | S |
| Calculated | 58.50 | 2.45 | 39.05 |
| Analysis | 55.85 | 2.04 | 41.97 |

EXAMPLE VI 40 mL (58.98 g, 0.33 moles) of 1,2,4-trichlorobenzene, 2.66 g (0.02 moles) of anhydrous AlCl₃, 21,64 g (0.10 moles) of thianthrene, and 3.22 g (0.10 moles) of sublimed sulfur (i.e., 1 mole of sulfur per mole of thianthrene) were combined and the sulfur and thianthrene were reacted according to the procedure described in Example I. The reaction mixture was heated and stirred for a period of about 3.5 hours. 14.66 g (i.e., a 59.4 percent reaction yield) of poly(thianthrenylene sulfide) were recovered from the post-reaction materials using methanol and filtration as described in Example I.

EXAMPLE V 100 mL (147.4 g, 0.81 moles) of 1,2,4-trichlorobenzene, 6.67 g (0.05 moles) of anhydrous AlCl₃, 38.55 g (0.25 moles) of biphenyl, and 28.86 g (0.90 moles) of sublimed sulfur (i.e., 3.6 moles of sulfur per mole of biphenyl) were combined and the sulfur and biphenyl were reacted according to the procedure described in Example I. The reaction mixture was heated and stirred for a period of eight hours.

Following the reaction period, 25 mL of concentrated HCl and 50 mL of water were added to the post-reaction material. The resulting mixture was allowed to stand overnight. The following day, the diluted post-reaction material was stirred and heated and then allowed to settle. Upon settling, the diluted post-reaction material separated to form an upper supernaturant and a lower oily layer. The supernaturant layer was decanted through a fluted filter. 35.58 g of solid material was recovered from the oily layer using methanol and filtration as described in Example I.

Toluene was added to the solid material and the resulting mixture was heated and slurried for about two hours. The slurry was then filtered through a suction filter. Solid material recovered in the suction filter was reslurried with toluene and suction filtered a second time. The solid material recovered in the second filtration was dried overnight in a vacuum oven operating at 100° C. 23.10 g (i.e., a 43.1 percent reaction yield) of poly(dibenzothiophene sulfide) were recovered from the post-reaction materials.

The molecular structure of the poly(dibenzothiophene sulfide) product was confirmed using infrared analysis. The elemental analysis of the polymer product is set forth in Table III. Using a hot bar, the product polymer was determined to have a softening point of 369° C. and a melt point of about 380 ° C. (literature melt point value is 373° C.). The poly(dibenzothiothene sulfide) product was also determined to have an inherent viscosity of 0.0819 dL/g (1.9732 g in 100 mL of concentrated sulfuric acid at 30° C.).

TABLE III

| Chemical Analysis of Poly(dibenzothiophene sulfide) Product | | | |
|---|---|---|---|
| | Weight Percent | | |
| | C | H | S |
| Calculated | 67.25 | 2.82 | 29.93 |
| Analysis | 63.61 | 2.26 | 34.67 |

EXAMPLE VI 100 mL (147.40 g, 0.81 moles) of 1,2,4-trichlorobenzene, 6.78 g (0.05 moles) of anhydrous AlCl$_3$, 77.10 g (0.50 moles) of biphenyl and 32.01 g (1.0 moles) of sublimed sulfur (i.e., 2 moles of sulfur per mole of biphenyl) were combined and the sulfur and biphenyl were reacted according to the procedure described in Examples I and V. The post-reaction materials were then treated with concentrated HCl and methanol as described in Example V. However, no solid product was obtained. The reaction yielded 27.4 g of dibenzothiophene crystals and 79.6 g of a heavy black oil.

EXAMPLE VII 100 mL (148.2 g, 0.82 moles) of 1,2,4-trichlorobenzene, 6.67 g (0.05 moles) of anhydrous AlCl$_3$, 38.55 g (0.25 moles) of biphenyl, and 32.06 g (1.0 mole) of sulfur (i.e., 4 moles of sulfur per mole of biphenyl) were combined and the sulfur and biphenyl were reacted according to the procedure described in Examples I and V. Following reaction, the post-reaction materials were treated with HCl, methanol, and toluene as described in Example V, 32.97 g (i.e., a 61.5 percent reaction yield) of poly(dibenzothiophene sulfide) were obtained.

As indicated by the above disclosure and examples, the present invention is well adapted to carry out the objectives and attain the ends and advantages mentioned above, as well as those inherent therein. While presently preferred embodiments have been described for purposes of this disclosure, numerous changes will be apparent to those skilled in the art. Such changes are encompassed within the spirit of this invention as defined by the appended claims.

What is claimed is:

1. A method comprising the step of reacting elemental sulfur and a reactant compound of the formula:

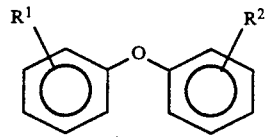

in an inert polyhaloaromatic solvent and in the presence of a strong Friedel-Crafts metallic halide catalyst to produce a polymer having repeating units of the formula:

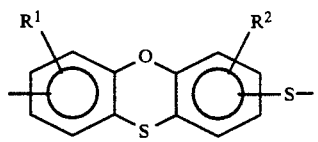

wherein $R^1$ and $R^2$ are independently selected from the group consisting of hydrogen and alkyl groups having from 1 to about 6 carbon atoms.

2. The method of claim 1 wherein said inert polyhaloaromatic solvent is selected from the group consisting 1,2-dichlorobenzene; 1,3-dichlorobenzene; 1,4-dichlorobenzene; 1,4-dibromobenzene; 2,5-dichlorotoluene; 2,3-dichlorotoluene; 2,4-dichlorotoluene; 1,2,4,5-tetramethyl-3,6-dichlorobenzene; 1-butyl-4-cyclohexyl-2,5-dibromobenzene; compounds of the formula $R^3Y_a$ wherein Y is chlorine, bromine, or iodine, a is an integer in the range of from 3 to 6, and $R^3$ is a polyvalent aromatic radical substituted with from 0 to 4 methyl groups, $R^3$ having a total number of carbon atoms in the range of from about 6 to about 16; and mixtures thereof.

3. The method of claim 2 wherein said compound of the formula $R^3Y_a$ is selected from the group consisting of 1,2,3-trichlorobenzene; 1,3,5-trichlorobenzene; 1,2,4-trichlorobenzene; 1,3-dichloro-5-bromobenzene; 1,2,3,5-tetrabromobenzene; hexachlorobenzene; 1,3,5-trichloro-2,4,6-trimethylbenzene; 2,2',4,4'-tetrachlorobiphenyl; 2,2',5,5'-tetraiodobiphenyl; 1,2,3,4-tetrachloronaphthalene; 1,2,4-tribromo-6-methylnaphthalene; and mixtures thereof.

4. The method of claim 3 wherein said inert polyhaloaromatic solvent comprises 1,2,4-trichlorobenzene.

5. The method of claim 1 wherein said elemental sulfur and said reactant compound are reacted at a temperature in the range of from about 20° C. to a temperature just below the boiling temperature of said polyhaloaromatic solvent.

6. The method of claim 1 wherein said elemental sulfur and said reactant compound are reacted at a temperature in the range of from about 90° C. to about 200° C.

7. The method of claim 1 wherein said strong Friedel-Crafts metallic halide catalyst is anhydrous aluminum chloride.

8. The method of claim 1 wherein said elemental sulfur is present in an initial concentration in the range of from about 3.5 moles to about 10 moles per mole of said reactant compound.

9. The method of claim 1 wherein said elemental sulfur is present in an initial concentration of about 4 moles per mole of said reactant compound.

10. The method of claim 1 wherein said reactant compound is selected from the group consisting of diphenyl ether and 2-methyldiphenyl ether.

11. The method of claim 10 wherein said reactant compound is diphenyl ether.

12. A method comprising the steps of:

forming a reaction mixture comprising elemental sulfur, a strong Friedel-Crafts metallic halide catalyst, an inert polyhaloaromatic solvent, and a reactant compound of the formula:

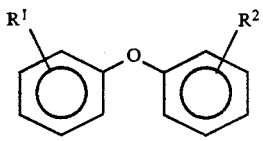

wherein $R^1$ and $R^2$ are independently selected from the group consisting of hydrogen and alkyl groups having from 1 to about 6 carbon atoms and (b) reacting said elemental sulfur and said reactant compound in said inert polyhaloaromatic solvent and in the presence of said strong Friedel-Crafts metallic halide catalyst to produce a polymer having repeat units of the formula:

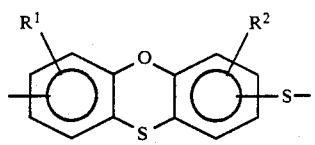

13. The method of claim 12 wherein said strong Friedel-Crafts metallic halide catalyst is anhydrous aluminum chloride.

14. The method of claim 13 further comprising the step of heating the resulting mixture of step (a) to a temperature in the range of from about 20° C. to a temperature just below the boiling temperature of said inert polyhaloaromatic solvent.

15. The method of claim 14 wherein the resulting mixture of step (a) is heated in said step of heating to a temperature in the range of from about 90° C. to about 200° C.

16. The method of claim 13 wherein said inert polyhaloaromatic solvent comprises 1,2,4-trichlorobenzene.

17. The method of claim 13 wherein said elemental sulfur is present in the resulting mixture of step (a) in an initial concentration in the range of from about 3.5 moles to about 10 moles per mole of said reactant compound.

18. The method of claim 17 wherein said reactant compound is diphenyl ether.

19. A polymer prepared in accordance with the method of claim 18.

20. A polymer having repeat units of the formula:

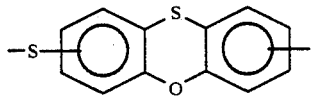

* * * * *

UNITED STATES PATENT AND TRADEMARK OFFICE
CERTIFICATE OF CORRECTION

PATENT NO. : 5,077,374

DATED : December 31, 1991

INVENTOR(S) : James W. Cleary

It is certified that error appears in the above-identified patent and that said Letters Patent is hereby corrected as shown below:

Col. 3, line 65, change "2-dimethylbiphenyl;" to --2-methyldiphenyl ether;--;

Col. 8, line 1, change "allows" to --allowed--;

Col. 8, line 39, change "ester" to --ether--;

Col. 9, line 9, change "and" to --was--;

Col. 10, line 1, change "Ml" to --mL--;

Col. 10, line 17, change "wire conbined" to --were combined--; and change "theanthrene" to --thianthrene--;

Col. 10, line 44, change "EXAMPLE VI" to --EXAMPLE IV--; and

Col. 10, line 46, change "21,64" to --21.64--.

UNITED STATES PATENT AND TRADEMARK OFFICE
CERTIFICATE OF CORRECTION

PATENT NO. : 5,077,374

DATED : December 31, 1991

INVENTOR(S) : James W. Cleary

It is certified that error appears in the above-identified patent and that said Letters Patent is hereby corrected as shown below:

Col. 13, claim 12, change line 18 to:
--(a) forming a reaction mixture comprising elemental--.

Signed and Sealed this

First Day of June, 1993

Attest:

MICHAEL K. KIRK

Attesting Officer

Acting Commissioner of Patents and Trademarks